United States Patent [19]

Wehr

[11] 4,227,949
[45] Oct. 14, 1980

[54] METHOD AND DEVICE FOR WELDING SUPERIMPOSED STRIPS OF THERMOPLASTIC

[75] Inventor: Hubert Wehr, Bornheim-Brenig, Fed. Rep. of Germany

[73] Assignee: Cyklop-Gesselschaft, Emil Hoffmann, Cologne, Fed. Rep. of Germany

[21] Appl. No.: 3,735

[22] Filed: Jan. 15, 1979

[30] Foreign Application Priority Data

Jan. 18, 1978 [DE] Fed. Rep. of Germany ....... 2802034

[51] Int. Cl.$^2$ ................ B29C 27/08; B65H 69/06
[52] U.S. Cl. ................ 156/73.5; 156/157; 156/502; 156/580; 228/112; 228/2
[58] Field of Search .............. 156/73.5, 157, 502, 156/580, 458; 228/2, 112

[56] References Cited

U.S. PATENT DOCUMENTS

| | | | |
|---|---|---|---|
| 3,442,203 | 5/1969 | Kobiella | 156/73.5 X |
| 3,469,300 | 9/1969 | Nagin | 228/112 |
| 3,734,383 | 5/1973 | Ritter et al. | 228/112 X |
| 3,873,387 | 3/1975 | Schoening | 156/73.5 |
| 3,920,504 | 11/1975 | Shoh et al. | 156/73.5 X |
| 4,119,449 | 10/1978 | Gould et al. | 156/73.5 |
| 4,154,641 | 5/1979 | Hutton | 156/73.5 X |

FOREIGN PATENT DOCUMENTS 1536270 3/1975 Fed. Rep. of Germany.
1924061 10/1976 Fed. Rep. of Germany.

Primary Examiner—Michael G. Wityshyn
Attorney, Agent, or Firm—Meyer, Tilberry & Body

[57] ABSTRACT

A device for friction welding together two plastic strips which provides a weld having a strength approaching that of the strips. Movable friction jaws are oscillated on axes perpendicular to the plane of and through the strips with the result that the frictional motion is greatest in the middle of the welding zone and decreases almost to zero toward the ends of the welding zone.

9 Claims, 3 Drawing Figures

METHOD AND DEVICE FOR WELDING SUPERIMPOSED STRIPS OF THERMOPLASTIC

This invention relates to a device for welding superimposed strips of thermoplastic by means of pressure and frictional heat, having stationary friction jaws and movable friction jaws which move the strips rapidly against one another in their plane under a contact pressure within a limited welding zone.

A device of this type is known wherein one strip is rapidly moved to and fro relative to the other within a limited zone, in a circular motion or in the longitudinal direction of the strips. The frictional heat thus generated then softens the strips on their surfaces which face one another and which are then welded together, when the friction jaws are stopped, and form a firm bond on cooling. This welding procedure, which is called "friction welding" in industry, can be applied to plastic strips consisting of different material, for example strips consisting of polypropylene or polyester.

The friction-welded bonds produced by the known device always have a lower strength than the strip itself. For this reason, it has also been suggested in the past to move the superimposed strips, on friction welding, to and fro transversely to the longitudinal direction in their welding zone in order to avoid changes in the length of the strips in the welding zone while carrying out the friction operation. However, even in the case of friction-welded bonds produced in this way, the strength of the seal is always lower than the strength of the strip.

It is the object of the invention to provide a friction-welding device, by means of which it is possible to produce welded bonds between thermoplastic strips, the strength of the bonds approaching the strength of the strip as closely as possible.

This object is achieved by the invention in such a way that the movable friction jaw consists of two jaw sections which extend in the longitudinal direction of the strips and the ends of which, facing away from one another, are each pivotably mounted on axes perpendicular to the planes of the strips at one end of the limited welding zone and are driven in such a way that their ends facing one another execute pivoting motions of equal magnitude in the same direction.

This design has the advantage that the frictional motion which is forced upon the strips to be joined to one another is of unequal magnitude over the length of the whole welding zone, is greatest in the middle of the welding zone and decreases almost to zero towards the ends of the welding zone. As a result of this, the friction heat generated is greatest in the middle of the welding zone and becomes smaller towards the ends of the welding zone. At the end of the welding zone, the strip, with its molecules oriented by the stretching process, then does not have an abrupt transition into a zone in which the molecules have lost their orientation due to heating, so that weakening of the strip, which can cause the strip to tear, does not occur at this point.

Advantageously, the ends, facing away from one another, of the friction jaw sections are pivotably mounted in the casing of the device by means of shaft journals. To obtain a precise frictional motion, it is appropriate when, on their surfaces facing one another, the friction jaws have grooves for inserting the strips in the welding zone, the depth of the grooves being smaller than the strip thickness and the width of the grooves corresponding to the strip width.

The ends, facing one another, of the movable friction jaw sections can be joined to a drive moving to and fro transversely to the longitudinal direction of the strips. To obtain a uniform pivoting motion of the two movable friction jaw sections, it is appropriate when their ends, facing one another, are nonpositively and/or positively connected to one another. For this purpose, the ends, facing one another, of the movable friction jaw sections can touch and be rounded off in such a way that they roll along on one another during their pivoting motion. Furthermore, the ends, facing one another, of the movable friction jaw sections can also carry radial teeth which mesh with one another.

Further features and avantages of the invention can be seen from the description which follows of an experimental device which is illustrated in more detail by the drawings in which.

Figure 2:
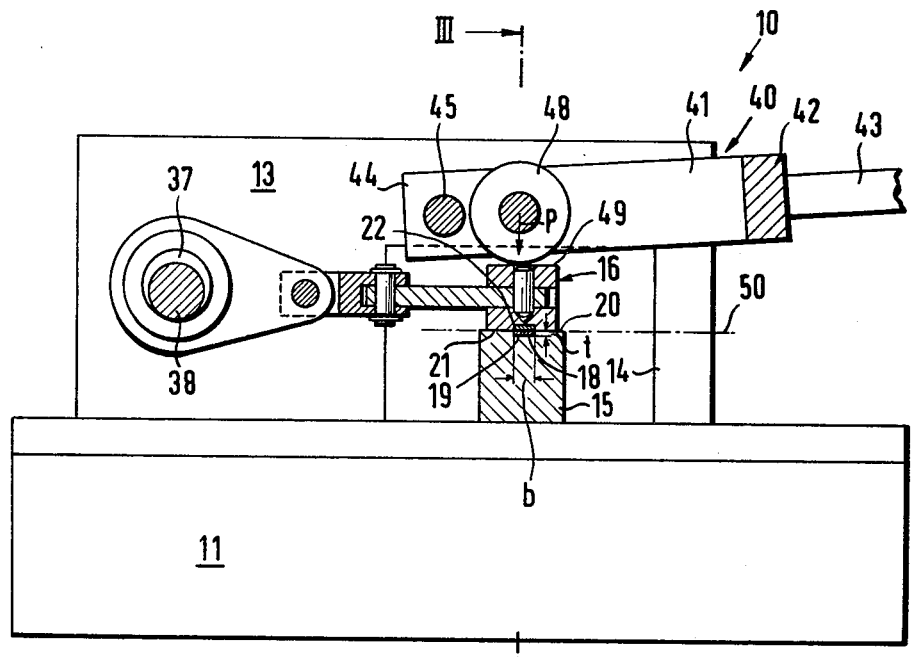
FIG. 2 shows the subject of FIG. 1 is a vertical longitudinal section along line II—II.
Figure 1:
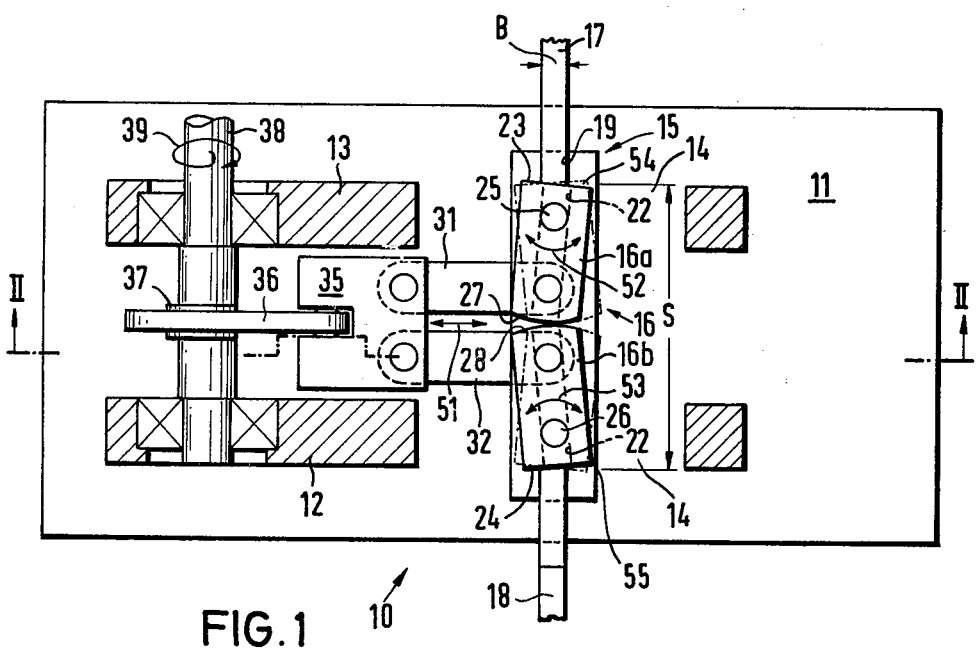
FIG. 1 shows a device for producing a friction-welded bond between thermoplastic strips in accordance with the invention, in a plan view and partially in horizontal section.

In the drawings, 10 designates a device for welding plastic strips, which device comprises a base plate 11 on which two longitudinal frames 12 and 13 are fixed, arranged at a lateral spacing from one another. In their front part, the two longitudinal frames 12 and 13 have a large aperture 14, in the zone of which a stationary friction jaw 15 is located on the base plate 11, which friction jaw extends transversely to the longitudinal frames 12 and 13 and through the aperture 14 thereof and is fixed on the base plate 11.

On the stationary friction jaw 15, a movable friction jaw 16 is located, which consists of two jaw sections 16a and 16b which are formed by substantially rectangular plates extending in the longitudinal direction of the strips 17 and 18 which are to be joined to one another. The lower strip 18 here lies in a groove 19 which is located in the surface 20 of the stationary friction jaw 15 and extends in the longitudinal direction of this stationary friction jaw and the width b of which corresponds to the strip width B. The depth t of this groove 19 is smaller than the strip thickness D of the strip 18 which is to be welded to the upper strip 17 in the device, that is to say, the lower strip 18 slightly projects beyond the surface 20 of the stationary friction jaw 15.

Like the stationary friction jaw 15, the jaw sections 16a, 16b of the movable friction jaw also have grooves 22 which extend on the underside 21, facing the surface 20 of the stationary friction jaw 15, in the longitudinal direction of these movable friction jaw sections 16a and 16b and the width b of which corresponds to the strip width B of the upper strip 17 and the depth of which is likewise smaller than the strip thickness of the strip 17. The strip 17 therefore also slightly projects beyond the underside 21 of the movable jaw sections 16a and 16b so that it firmly rests on the lower strip 18, while the surfaces 20 and 21 of the friction jaws 15 and 16 do not yet touch.

Figure 3:
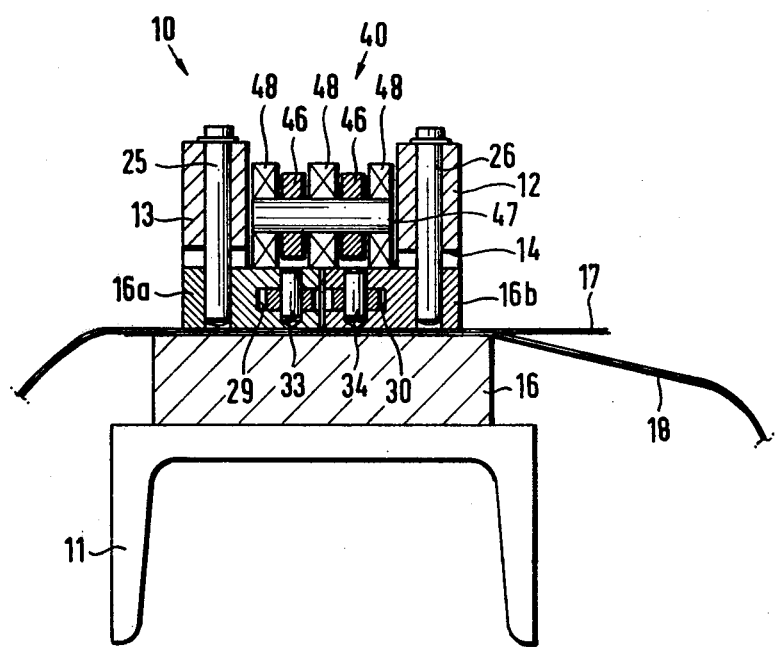
FIG. 3 shows the subject of FIG. 2 in a cross-section along line III—III.

As can be seen from FIG. 3, the ends 23 and 24, facing away from one another, of the movable jaw sections 16a and 16b are pivotably mounted in the longitudinal frames 13 and 12 respectively by means of shaft journals 25 and 26. Their ends 27, 28, facing one another, are rounded off in such a way that they roll along one another during their pivoting motion about the shaft journals 25, 26. In the zone of their ends 28 and 27 facing one another, the movable jaw sections 16a and 16b each have a slot 29 and 30 respectively, which is open at the edge and in which actuating rods 31 and 32 engage which are pivotally joined to the movable friction jaws 16a and 16b by link pins 33 and 34.

The other ends of the actuating rods 31 and 32 are pivotally fastened to a push rod 35 which is joined to a connecting rod 36 which in turn is moved to and fro in the longitudinal direction of the actuating rods 31 and 32 by a rotationally driven eccenter 37. The drive axle 38 of the eccenter 37 is rotatably mounted in the longitudinal frames 12 and 13 and is rotationally driven in the direction of the arrow 39 by a motor which is not shown here in more detail.

Above the movable friction jaw sections 16a and 16b a pressure device is pivotably mounted in the longitudinal frames 12 and 13, and this as a whole is designated as 40. The pressure device consists of a two-pronged fork 41, a hand lever 43 being fixed to the closed end 42 thereof and the open end 44 thereof being pivotably mounted in the two longitudinal frames 12 and 13 by means of an axle 45. Above the movable friction jaws 16a and 16b, three pressure rollers 48 are rotatably mounted on a shaft 47 between the prongs 46 of the fork 41 and to the side of the latter; these pressure rollers rest on the upper side 49 of the movable friction jaws 16a and 16b and exert on the latter a pressure P in a direction perpendicular to the plane 50 of the strips.

The mode of action of the device is as follows:

To join the strips 17 and 18, the strip 18 is inserted into the groove 19 of the stationary friction jaw 15 and the strip 17 is inserted into the groove 22 of the movable friction jaw 16, the jaw sections 16a through 16b of which are appropriately brought into such a position for this purpose that their grooves 22 are aligned with the groove 19, located below the former, of the stationary friction jaw 15. The drive motor which turns the shaft 38 is then switched on. The actuating rods 31 and 32 then execute a to and fro motion in the direction of the double arrow 51, the jaw sections 16a and 16b executing pivoting motions of equal magnitude in the same direction about their shaft journals 25 and 26. Simultaneously, a vertical pressure is exerted on the hand lever 43 of the pressure device 40, which pressure is transmitted via the contact pressure rollers 48 to the movable jaw sections 16a and 16b, while the contact pressure rollers 48 roll along on the upper side 48 of these jaw sections 16a and 16b. With the to and fro pivoting motion of the jaw sections 16a and 16b in the direction of the double arrows 52 and 53, the upper strip 17 lying in the grooves 22 is taken along in the welding zone limited by the length of the movable friction jaw 16 and is moved to and fro under pressure relative to the strip 18 lying below. However, the motion is here of unequal magnitude over the length of the welding zone S, since the lateral deflection of the movable jaw sections 16a and 16b is substantially greater at their ends 27 and 28 facing one another than at the rear ends 23 and 24. For this reason, heating in the central part of the welding zone S is substantially more intense than at its ends 54 and 55.

The invention is not restricted to the illustrative embodiment, but a large number of modifications is possible for implements which are simple to handle, without departing from the scope of the invention. In particular, the ends, facing one another, of the movable friction jaw sections can carry radial teeth which mesh with one another, in order to force the movable jaw sections into a pivoting motion of equal magnitude in opposite directions. Moreover, it is also possible to drive the movable friction jaw sections by different means in order to cause them to execute this desired pivoting motion.

I claim:

1. A device for welding superimposed strips of thermoplastic by means of pressure and frictional heat, comprising a stationary friction jaw and an opposed movable friction jaw which move the strips rapidly against one another in their plane under a contact pressure within a limited welding zone, characterized in that the movable friction jaw consists of two jaw sections which extend in the longitudinal direction of the strips, the remote ends of said sections being pivotably mounted on axes perpendicular to the plane of the strips and at one end of the welding zone; and means driving said jaw sections in such a way that their adjacent ends execute pivoting motions of equal magnitude in the same direction.

2. A device according to claim 1, characterized in that the remote ends are pivotably mounted in a casing by means of shaft journals.

3. A device according to claim 1 or 2 characterized in that said friction jaws have grooves on juxtapositioned surfaces for inserting the strips in the welding zone, the depth of the grooves being smaller than the strip thickness and the width of the groove corresponding to the strip width.

4. A device according to claim 1 or 2 characterized in that said driving means comprise a drive moving to and fro transversely to the longitudinal length of the strips.

5. A device according to claim 1 or 2 characterized in that said adjacent ends of the movable friction jaw sections are in passive contact with one another.

6. A device according to claim 5, characterized in that the said adjacent ends of the movable friction jaw sections touch and are rounded off in such a way that they roll along on one another during their pivoting motion.

7. A device according to claim 1 or 2 characterized in that the said adjacent ends of the movable friction jaw sections are positively connected to one another.

8. A device according to claim 7, characterized in that said adjacent ends of the movable friction jaw sections carry radial teeth which mesh with one another.

9. A method of welding together the superimposed portions of thermoplastic strips comprising the steps of pressing said portions into pressure engagement and simultaneously moving said portions laterally relative to each other in decreasing amounts longitudinally in both directions from a point between the ends of the desired weld area.

* * * * *